United States Patent [19]

Nakamura et al.

[11] Patent Number: 5,448,118
[45] Date of Patent: Sep. 5, 1995

[54] LIQUID COOLED MOTOR AND ITS JACKET

[75] Inventors: Kosei Nakamura; Yukio Katsuzawa; Michi Masuya, all of Yamanashi, Japan

[73] Assignee: Fanuc Limited, Yamanashi, Japan

[21] Appl. No.: 66,067

[22] PCT Filed: Oct. 5, 1992

[86] PCT No.: PCT/JP92/01288

§ 371 Date: May 28, 1993

§ 102(e) Date: May 28, 1993

[87] PCT Pub. No.: WO93/07670

PCT Pub. Date: Apr. 15, 1993

[30] Foreign Application Priority Data

Oct. 5, 1991 [JP] Japan .................. 3-283481

[51] Int. Cl.⁶ ............... H02K 9/19; H02K 9/00; H02K 1/20; H02K 5/20
[52] U.S. Cl. ....................... 310/54; 310/58; 310/64; 310/89
[58] Field of Search ........... 310/42, 54, 58, 59, 310/60 A, 64, 89; 29/596; 72/253.1, 264, 268

[56] References Cited

U.S. PATENT DOCUMENTS

| | | | |
|---|---|---|---|
| 2,700,115 | 1/1955 | Mowery, Jr. | 310/57 |
| 3,255,517 | 6/1966 | Barbera | 72/264 |
| 3,748,507 | 7/1973 | Sieber | 310/58 |
| 3,882,334 | 5/1975 | Newill | 310/59 |
| 4,463,057 | 7/1984 | Knürr | 72/253.1 |
| 4,691,131 | 9/1987 | Nakano | 310/54 |
| 4,745,314 | 5/1988 | Nakano | 310/54 |
| 4,908,538 | 3/1990 | Geberth, Jr. | 310/59 |
| 5,084,642 | 1/1992 | Katsuzawa et al. | 310/54 |
| 5,229,673 | 7/1993 | Katsuzawa et al. | 310/64 |

FOREIGN PATENT DOCUMENTS

| | | |
|---|---|---|
| 2312874 | 12/1976 | France . |
| 59-37854 | 3/1984 | Japan . |
| 60-121941 | 6/1985 | Japan . |
| 61-49637 | 3/1986 | Japan . |
| 61-170254 | 7/1986 | Japan . |
| 62-225146 | 10/1987 | Japan . |
| 1-198243 | 8/1989 | Japan . |
| 766951 | 1/1957 | United Kingdom ............ 310/64 |

*Primary Examiner*—Clayton E. LaBalle
*Attorney, Agent, or Firm*—Staas & Halsey

[57] ABSTRACT

Liquid cooled stator jacket and a method for extruding a billet of aluminum alloy to form a stator jacket. The billet of aluminum alloy is extruded to form a plurality of conduits along the longitudinal direction of the billet and to form a plurality of thickness lightening holes along the longitudinal direction of the billet. The thickness lightening holes are equally spaced in a circumferential direction of the billet and the conduits are arranged on both sides of each of the thickness lightening holes.

5 Claims, 2 Drawing Sheets

LIQUID COOLED MOTOR AND ITS JACKET

BACKGROUND OF THE INVENTION

1. Field of the Invention

The present invention relates to a liquid cooling structure of an electric motor such as an induction motor, and more particularly, to a jacket for cooling a stator and a method of manufacturing the same and an improvement in the structure of a liquid cooled motor using the jacket.

2. Description of the Related Art

For the purpose of enhancing the cooling efficiency in an electric motor and relieving the peripheral equipment from being adversely affected by heat dissipation, there has been proposed a liquid cooled motor which includes a casing 1 having liquid cooling conduits 2, which serves as a cooling jacket for a stator 3, as shown in FIGS. 3 (PRIOR ART) and 4 (PRIOR ART).

In this case, the casing 1 is usually sand-cast from aluminum alloy, and housings 4 and 5 are separately attached to the front and rear surfaces, respectively, of the casing 1 by ordinary bolts. This entails the following problems.

Due to characteristics of the casting, the wall portions of the casing 1, inevitably involve cavities 7 in the interior or on the surface thereof, which may cause liquid leakage if the casing 1 is used as the liquid cooling structure. In particular, the cavities 7 are liable to be exposed on the inner surface or the end surface which has been subjected to cutting operations, thereby causing the leak of the coolant. In order to fill the cavities 7, there may be needed, for example, a time-consuming and costly treatment requiring casing 1 to be dipped into the special sealing compound after being cast.

It is also impossible to provide the sand-casting with deep holes and threaded holes having an accurate configuration by the sand-casting process alone. Hence, if they are needed, the sand-casting must be subjected to further cutting operation after casting. In addition, due to the impossibility of obtaining a higher dimensional accuracy, a fine or complicated sectional configuration is unable to be provided on the interior of the liquid cooling conduits 2.

Further, at least eight ordinary bolts 6 must be used to fasten the front and rear housings to the casing 1, involving a large number of assembling steps which not only may cause an unevenness in the screw torque of the bolts 6 but also requires a greater precaution to ensure a uniform fastening.

SUMMARY OF THE INVENTION

It is therefore an object of the present invention to provide a liquid cooled motor and its jacket presenting a higher reliability with respect to liquid leakage and less assembling steps and an improved cooling efficiency.

In order to achieve the above object, the present invention comprises the steps of extruding a billet of aluminum alloy so as to provide conduits therein for the passage of coolant, and cutting the extruded billet into a desired length to obtain a jacket serving as a stator cooling jacket, which also serves as a casing.

A liquid cooled motor according to the present invention comprises the stator cooling jacket having front and rear surfaces, a front housing attached to the front surface, and a rear housing attached to the rear surface, the jacket and the front and rear housings being fastened together by means of a plurality of tie bolts extending from the front housing to the rear housing.

Preferably, the front and rear housings are made of cast iron and respectively include flanges having a plurality of holes through which the tie bolts are allowed to pass and a plurality of threaded holes for receiving threaded end portions of the tie bolts, respectively.

Preferably, the jacket includes a plurality of thickness lightening holes formed, when extruding the jacket for cooling a stator, and used as holes through which the tie bolts are allowed to pass.

Preferably, each of the plurality of thickness lightening holes have a sectional configuration a part of which permits only the axial displacement of the tie bolt inserted into the thickness lighting holes.

Preferably, the plurality of thickness lightening holes are equally spaced in the circumferential direction of the jacket, and the plurality of conduits for the passage of coolant are arranged on both sides of each of the thickness lightening holes.

Preferably, each of the plurality of conduits include a multiplicity of inwardly protruding cooling fins.

As described above, the casing which is of an extrusion molded material according to the present invention provides a stator cooling jacket made of aluminum alloy being free of cavities. Furthermore, the fastening by means of the tie bolts contributes to a reduction in the number of assembling steps and uniformity of the screw torque applied thereto. The sectional configuration of the thickness lightening holes permitting only the axial displacement of the tie bolts present effective measures for preventing a radial positional offset between the casing and the front and rear housings. Moreover, by capitalizing on the characteristics of the extruded profile that the wall portions will not form the cavities and that the fine structure can be formed with a higher accuracy, the liquid cooling conduits 2 are configured to have a multiplicity of inwardly protruding cooling fins, thereby enhancing the cooling efficiency.

DETAILED DESCRIPTION OF THE PREFERRED EMBODIMENTS

Figure 2:
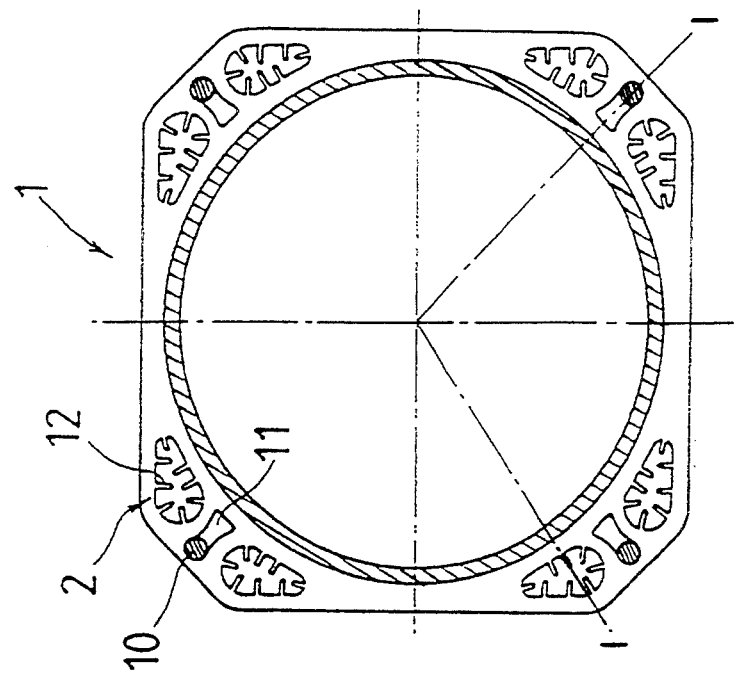
FIG. 2 is a sectional view of the jacket taken along the line B—B in FIG. 1.
Figure 1:
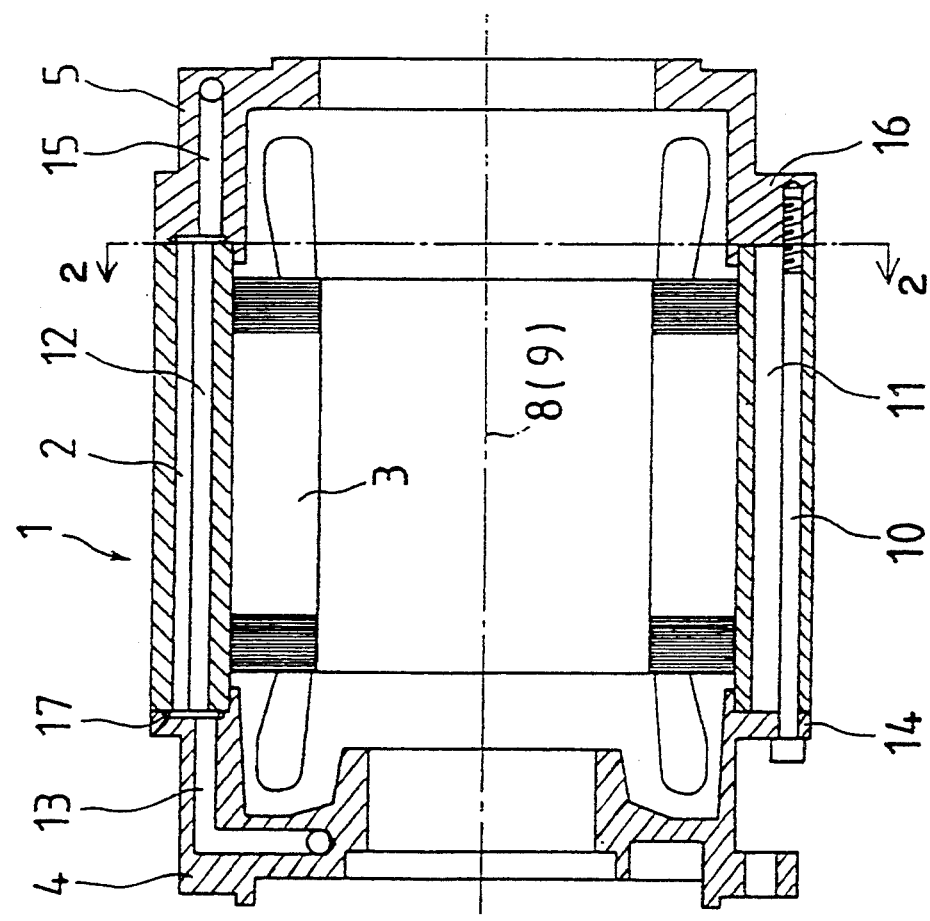
FIG. 1 is a sectional front elevation of a jacket for cooling a stator constructed in accordance with an embodiment of the present invention, taken along the line A—A in FIG. 2.
Figure 3:
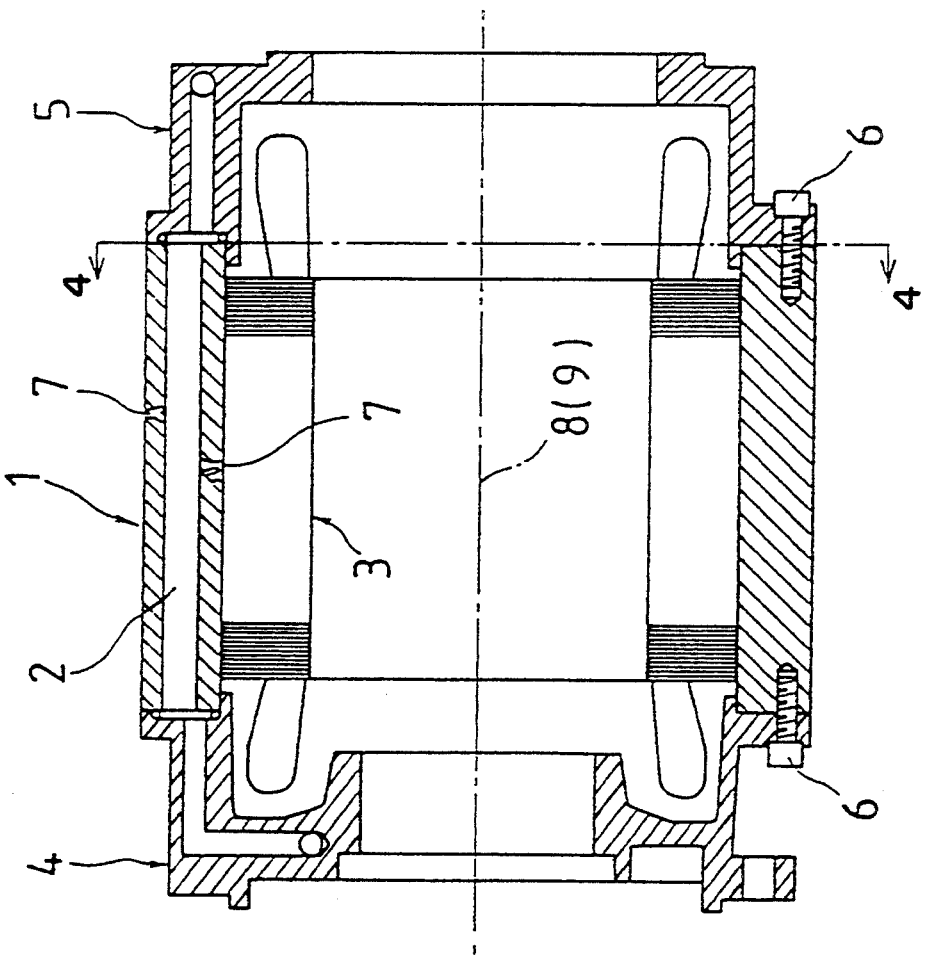
FIG. 3 (PRIOR ART) is a sectional front elevation of a conventional jacket for cooling a stator, taken along the line C—C in FIG. 4.
Figure 4:
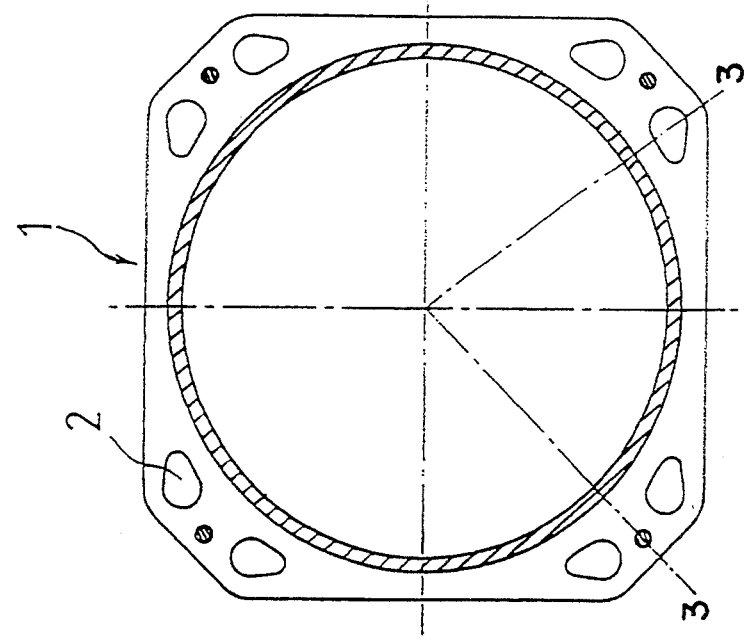
FIG. 4 (PRIOR ART) is a sectional view of the conventional jacket taken along the line D—d in FIG. 3.

Referring first to FIGS. 1 and 2, there is depicted a framing for an induction motor constructed in accordance with the present invention, which comprises a casing 1, a front housing 4, and a rear housing 5, each being integrally combined with the others by means of tie bolts 10.

The casing 1 serving as a cooling jacket for a stator 3 is formed by cutting a so-called extrusion molded material obtained by extruding a billet of aluminum alloy through a die designed for a predetermined shape. The extrusion molded material is obtained in the form of a generally elongated tube having a cross section as shown in FIG. 2; each of its four corners having larger wall thickness is provided with a pair of conduits and thickness lightening holes 11 are symmetrically arranged. The thickness lightening holes 11 are provided in order to regulate the wall thickness existing between the pair of conduits 2 in conformity to requirements in extrusion molding.

The extrusion molding characteristics require the conduits 2 and the thickness lightening holes 11 to longitudinally extend through the extruded profiles. Thus, any casing 1 formed by radially cutting this material presents a section having the conduits 2 and thickness lightening holes 11 as shown in FIG. 2. The conduits 2 function as liquid cooling conduits 2, while the thickness lightening holes 11 longitudinally (or axially) receive the tie bolts 10.

By utilizing inherent features of the extruded profiles that their walls are free from cavities and that fine structures can be formed with a higher accuracy, the liquid cooling conduits 2 according to this embodiment are high precision machined to have a multiplicity of inwardly protruding cooling fins 12 as depicted in FIG. 2. The thickness lightening holes 11 are respectively machined to have a sectional configuration allowing the tie bolt 10 extending therethrough to be displaced in only the longitudinal direction of the casing 1, while preventing its radial displacement in section. Therefore, such casing 1 formed by extrusion molding can be provided with both the conduits 2 having a higher cooling efficiency and the thickness lightening holes 11 having a circular sectional portion preventing the tie bolt from backlashing.

On the other hand, the front and rear housings 4 and 5 for enclosing the stator 3 and a rotor (not shown) while permitting a rotor shaft to extend therethrough are made of a cast iron in consideration of the requirements for their configuration and strength. The front housing 4 comprises a circulating conduit 13 communicating with the liquid cooling conduit 2 located on the side of the casing 1, and a front flange 14 having through-holes for the tie bolts 10. The rear housing 5 comprises a lead-in/lead-out conduit 15 communicating with the liquid cooling conduit 2 resting on the side of the casing 1, and a rear flange 16 having threaded holes into which the threaded portions of the tie bolts 10 are screwed.

In assembling this liquid-cooled motor, the stator 3 is first placed within the casing 1, and the front and rear housings 4 and 5 are respectively attached to the front and rear surfaces of the casing 1 in such a manner that the cooling conduit 2 of the casing 1 communicates with the circulating conduits 13 and 15 of the front and rear housings 4 and 5, respectively, through an O ring 17. Then, the tie bolts 10 are inserted by way of the bolt through-holes formed in the four corners of the front flange 14 of the front housing 4 into the circular sectional portions of the thickness lightening holes 11 of the casing 1, their threaded end portions being firmly screwed into the threaded holes formed in four corners of the rear flange 16 of the rear housing 5 with the equal torque.

Upon the actuation of the electric motor, a separately disposed pump is allowed to be connected with the lead-in/lead-out conduit 15 of the rear housing 5 so as to feed a cooling medium such as oil into the liquid cooling conduit 2 of the casing 1. The coolant circulates by way of the conduits of the casing 1 and the front and rear housing, and then from the rear housing 5 through a radiator back to the pump. The radiator is independently placed on the outside of the motor. During the circulation, the coolant absorbs heat of the stator 3 and the casing 1 for removing to the outside.

The presence of the circular sectional portions in the thickness lightening holes 11, intended to receive the tie bolts 10, prevents the tie bolts 10 from being moved in the radial direction of the casing 1, thus preventing the casing 1 from being radially displaced relative to the front and rear housings 4 and 5 due to vibration of the motor during operation, thereby preventing the occurrence of offset between the stator shaft and the rotor shaft.

The sectional configurations of the liquid cooling conduits 2 and the thickness lightening holes 11 are not limited to those shown in FIG. 2 as long as the abovedescribed functions are ensured. The tie bolts 10 may be replaced with combinations of a tie bolt and a nut. In this case, the tie bolts can be secured by the nuts after being inserted through holes in the rear flange 16 of the rear housing 5.

What is claimed is:

1. A liquid cooled motor comprising:
    a stator cooling jacket having front and rear surfaces and being a billet of aluminum alloy extruded to form a plurality of conduits along a longitudinal direction of said billet for passing coolant and to form a plurality of thickness lightening holes along the longitudinal direction of said billet, said plurality of thickness lightening holes being equally spaced from one another around the circumferential direction of said billet and said plurality of conduits being arranged on both sides of each of said plurality of thickness lightening holes around the circumferential direction of said billet;
    a front housing attached to said front surface of said stator cooling jacket;
    a rear housing attached to said rear surface of said stator cooling jacket; and
    a plurality of tie bolts which fasten together said stator cooling jacket and said front and rear housings, said tie bolts extending from said front housing to said rear housing through said plurality of thickness lightening holes of said stator cooling jacket.

2. A liquid cooled motor according to claim 1, wherein
    said front and rear housings are made of cast iron and respectively include flanges having a plurality of holes through which said tie bolts are allowed to pass and a plurality of threaded holes for receiving threaded end portions of said tie bolts, respectively.

3. A liquid cooled motor according to claim 1, wherein each of said plurality of thickness lightening holes has a sectional configuration a part of which permits only the axial displacement of said tie bolt inserted into said thickness lighting holes.

4. A liquid cooled motor according to claim 3, wherein each of said plurality of conduits includes a multiplicity of inwardly protruding cooling fins.

5. A liquid cooled motor according to claim 1, wherein each of said plurality of conduits includes a multiplicity of inwardly protuding cooling fins.

* * * * *